Feb. 6, 1934.  P. H. STAAFF  1,946,366
MEANS FOR LUBRICATION
Filed March 4, 1930
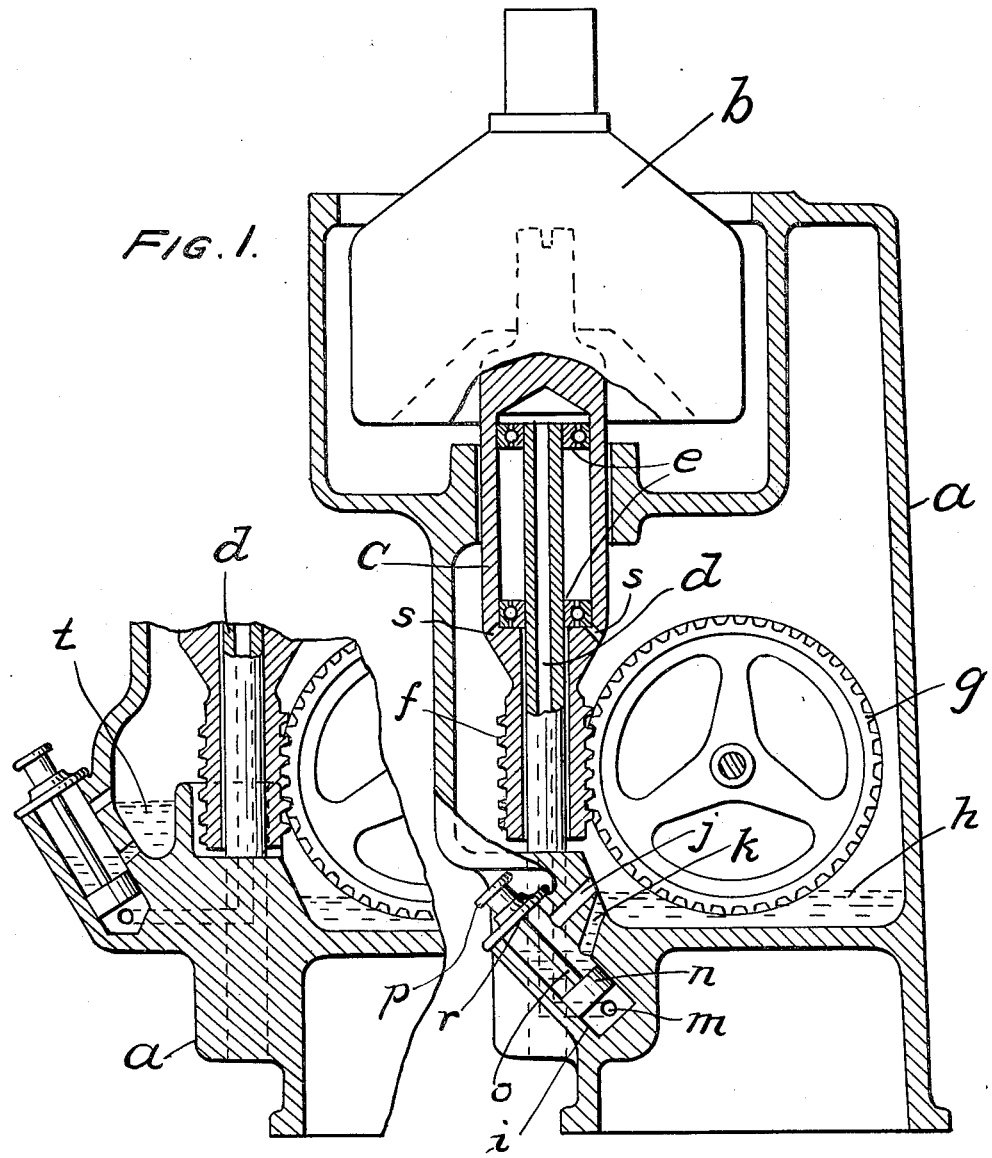
INVENTOR
Per Hilding Staaff
BY
Busser and Harding
ATTORNEYS.
WITNESS:
Rob't P. Kitchel.

Patented Feb. 6, 1934

1,946,366

UNITED STATES PATENT OFFICE 1,946,366

MEANS FOR LUBRICATION

Per Hilding Staaff, Stockholm, Sweden, assignor to The De Laval Separator Company, New York, N. Y., a corporation of New Jersey Application March 4, 1930, Serial No. 433,011, and in Sweden March 22, 1929

1 Claim. (Cl. 308—170)

The object of the invention is to provide means for efficiently oiling the bearings of a centrifugal separator, and particularly that type of centrifugal separator in which the bowl is carried by a vertically extending tubular member which revolves on roller or ball bearings carried by a vertically extending stationary rod. Known methods of oiling fail to effectually guard against penetration of milk and moisture into the space between the rod and the tube and resultant corrosion of the ball bearings. A further object of the invention is to provide means for oiling that will guard against such penetration of milk and moisture into the space occupied by the bearings. A further object of the invention is to adapt the lubricating means for use with the splash oiling system known in the art.

Two of various possible embodiments of the invention are shown in the drawing.

Fig. 1 is a vertical section through the centrifuge and its supporting frame and lubricating system.

Fig. 2 is a detail view in vertical section of a modification.

The separator bowl $b$ is fixed to a revoluble tube $c$ surrounding an upright rod $d$ secured to the frame $a$. Between the rod and tube are two or more roller or ball bearings $e$.

The machine frame $a$ is shaped to provide an oil reservoir $h$. A worm $f$ on the tube $c$ is driven by a worm wheel $g$ whose teeth, in the rotation of the wheel, travel through the oil bath and splash oil toward the bearings.

The supporting rod $d$ is provided with an axial channel open at the top end. In the frame is a cylindrical boring $i$ which communicates with the oil reservoir through bored holes $j$ and $k$ and which also communicates with the channel in rod $d$ through a hole $m$. Hole $k$ communicates with the oil bath below its surface but above its bottom. Hole $j$ opens into the space just above surface of the oil bath. Within the cylinder $i$ is a piston $n$ from which extends a piston rod $o$ through a closure $r$, the piston rod having an outside handle $p$ by means of which the piston may be manually reciprocated.

When piston $n$ is in the position shown in Fig. 1 and it is moved up from that position, oil streams out through hole $j$ into the oil bath (rendering a packing box around the piston unnecessary) and as soon as piston $n$ moves beyond hole $k$, oil streams from the oil bath into the space below the piston. When the piston is forced down, oil below the piston is forced through the hole $m$ into the axial channel in rod $d$ and streams out over the bearings $e$ positioned within the tube $c$. Surplus oil from the bearings escapes through holes $s$ beneath the lower ball bearing in the tube $c$ into the interior of the frame and thence back into the oil reservoir.

The hole $k$ should open into the oil reservoir at such height above its bottom that the oil flowing into the cylinder $i$ will be taken from the upper part of the oil bath. As the bearings are usually lubricated immediately before the machine is started, and as separators very often are in use only periodically with several hours of rest between successive operations, any impurities that may be contained in the oil will sink down to the bottom of the oil bath during the rest period, so that only substantially clean oil will be pumped to the bearings.

The described construction permits the hole $j$ to open into the oil reservoir near to or (as shown) above the level of the oil bath therein, so that the weight of the column of oil in the reservoir offers little or no resistance to the inflow of oil into the reservoir, thereby, as above stated, making it unnecessary to provide a packing box around the piston.

In some cases it may be more desirable to conduct oil to the pump from a secondary oil bath in a secondary oil reservoir $t$ enclosed in the frame and, as shown in Fig. 2, located at a higher elevation than the main oil bath and so positioned that oil will be splashed up into it from the main oil bath when the machine is running. This arrangement enables the oil pump to be located at a higher elevation, which may have some advantages, such as greater convenience of operation.

Having now fully described my invention, what I claim and desire to protect by Letters Patent is:

The combination with a stationary member, a rotatable member and bearings between said members, one of said members having a channel extending longitudinally therethrough and communicating with the space occupied by the bearings, of means providing an oil reservoir, a piston chamber whose longitudinal extension is at an angle to the horizontal and the lower end of which communicates with said channel, a piston in the piston chamber, there being two passages between the piston chamber and the oil reservoir at progressively greater distances from its lower end and opening into the oil reservoir, the lower passage opening into the oil reservoir above its bottom and through which oil is adapted to flow therefrom into the piston chamber when the piston is moved upward therein, the upper passage opening into the oil reservoir at a substantially higher level than the lower passage so as to enable it to open thereinto above the oil level therein, the piston being adapted to be moved downward beyond both openings and when so moved to force into said channel oil previously conveyed into the chamber below the piston through said lower opening and when moved upward to force through the upper of said passages into the oil reservoir oil conveyed into said chamber above the piston through the lower of said passages in the downward stroke of the piston.

PER HILDING STAAFF.